United States Patent [19]

Myers

[11] Patent Number: 4,546,846
[45] Date of Patent: Oct. 15, 1985

[54] SAFE LOCK ANTI-THEFT HYDRAULIC BRAKE CONTROL SYSTEM

[76] Inventor: Ronald L. Myers, 2 Westport, Irvine, Calif. 92714

[21] Appl. No.: 601,975

[22] Filed: Apr. 19, 1984

[51] Int. Cl.$^4$ .............................................. B60R 25/00
[52] U.S. Cl. .................................... 180/287; 188/253
[58] Field of Search .......................... 180/287; 303/89; 188/353

[56] References Cited

U.S. PATENT DOCUMENTS

| | | | |
|---|---|---|---|
| 3,515,442 | 6/1970 | Whittemore | 303/89 |
| 3,552,518 | 1/1971 | Aidner | 180/287 |
| 3,557,584 | 1/1971 | Triglia | 70/179 |
| 3,559,755 | 2/1971 | Pond | 180/287 |
| 3,656,574 | 4/1972 | Edwards | 180/287 |
| 3,669,210 | 6/1972 | Haefner | 180/287 |
| 4,018,314 | 4/1977 | Richmond | 188/353 |
| 4,040,675 | 8/1977 | Richmond | 303/89 |
| 4,196,939 | 4/1980 | Kavis | 303/89 |

Primary Examiner—Richard A. Bertsch
Attorney, Agent, or Firm—Harland L. Burge, Jr.

[57] ABSTRACT

A hydraulic lock-up anti-theft system which energizes and holds the braking system in the active mode for vehicles in the park position and which includes provisions for ignition interlock to prevent vehicle start-up and provides an alert signal, if mechanical tampering with the systems occurs, is presented. Improvement over the prior art include ability to operate under any environmental temperature variations, elimination of any potential valve seating vibration induced degradation, elimination of necessity for cam position braking mechanisms, minimization of activation loads in manual arming and positioning and the ability to add parallel and independent activation circuits to the design.

11 Claims, 9 Drawing Figures

SAFE LOCK ANTI-THEFT HYDRAULIC BRAKE CONTROL SYSTEM

BACKGROUND AND SUMMARY OF THE INVENTION

1. Field of the Invention

This invention relates to the minimizing of the success of vehicle theft by employing a system which provides for safety locking up the vehicle brake hydraulic fluid in a manner to prevent movement of the vehicle and to provide a method for tying into existing auto theft alarms, should destructive tampering with the anti-theft system take place.

2. Description of the Prior Art

Vehicle anti-theft devices that perform a lock-up function of the hydraulic fluid in the wheel cylinders are exemplified by U.S. Pat. Nos. 3,515,442; 3,557,584; 3,559,755; 4,081,314; 4,040,675; 4,196,939. Each of these, by examination, offers a means of locking up hydraulic fluid to the wheel cylinders which activate the vehicle rakes. In each of these concepts, one-way check flow valves are utilized in one way or another to pass fluid from the master cylinder into the brake lines and wheel cylinders. None of the aove systems provides for the necessary accommodation of both heating and cooling effects caused by environment changes which expand and contract the hydraulic fluid. U.S. Pat. Nos. 4,018,314 and 4,040,675 have means, via check valves, to allow for thermal expansion relief but not for thermal contraction.

The ability to withstand thermal expansion and cooling contraction is very important, in that from a temperature of 40° F. to 120° F. a typical hydraulic fluid will undergo a density change of approximately 7% to 8%. This change with a system locked up provides for a major pressure change in the wheel cylinder, and results in the need for venting high-pressure buildup in the event of temperature increase; on the other hand, the pressure will rapidly fall off with a temperature decrease, and a one-way check system will not allow for both effects. Indeed, in some parts of the world, wide temperature changes on the order of 30° F. to 60° F. in one day can be expected to occur. A vehicle locked up at 60° F. would not be so locked up at 0° F.

U.S. Pat. No. 3,559,755 utilizes an electrical-operated solenoid control member for lock-up of the hydraulic fluid; whereas, the others referred to above are all manually operated to overcome possible loss of power effects. U.S. Pat. Nos. 4,018,314 and 4,040,675 place the aforementioned check valves integral with a primary operating valve function, and both patents provide for a mechanical lock position of the primary operating valve member; U.S. Pat. No. 4,018,314 utilizes a locking projection, operated by a key, to position the primary operating valve member; U.S. Pat. No. 4,040,675 utilizes a rotary cam action lock-up in conjunction with a key-operated cable. In both of these latter patents, the lock-up pressure is relieved by reposition of the primary operating valve member to release fluid towards the master cylinder. U.S. Pat. No. 4,196,939 and U.S. Pat. No. 3,557,584 accomplish the lock-up shut-off function by use of rotary mechanical motion to position and close shut-off parts.

Check valves as used in most of these patents, particularly multiple check valves, may also be subject to wear and tear by degradation by normal road- and engine-induced vibration, if no isolation from vibration effects is used; as a result, it is highly desirable to eliminate check valves if possible, or reduce their number to as few as possible, preferably one or none. The positioning of the primary valve member is important to error-free operation. Cam and lock-up positioning requirements result in added care in fabrication and assembly steps. Errors induced by such fabrication and assembly steps can be eliminated by use of symmetrical geometries that function regardless of position in assembly, and which are easily quality-checked in fabrication.

In order for any of these systems to function, the check valves must always be leak-tight and cannot allow the braking pressure to degrade rapidly with passage of time or usage. The slightest back leakage of hydraulic fluid over a small time will release the brake lock-up function. Further, under brake fluid hydraulic pressure load, the manual operation of the primary valving member by normal key arming movement will be very difficult, due to the effects of cumulated seal loads. Further, none of the above concepts provide for alarm safing at the arming mechanism to prevent tampering from immobilizing the entire anti-theft system.

The present invention disclosed herein is generally related to providing a means to deter theft of vehicles equipped with hydraulic fluid braking systems, while also providing safety interlocks into existing ignition systems and further means of adapting into audible alarm systems that presently exist for purposes of minimizing vehicle theft. The "SAFE LOCK ANTI-THEFT HYDRAULIC BRAKE CONTROL SYSTEM" comprises a compact control member which is readily adapted to existing braking systems through insertion of this compact control member into the hydraulic system between the master cylinder and the wheel cylinders, an interlock switch system which prevents auto ignition when the control member is activated, an accumulator system which accommodates temperature effects, and an arming system which sets the control member to lock the brakes of the vehicle. The accumulator system member automatically compensates for environmental thermal changes. No control passages or members are subject to normal-use vibration degradation. The control member is manually armed and requires no external electrical energy to operate.

The compact control member contains two separate piston assemblies which, by position, control brake hydraulic fluid flow in and out of the vehicle braking system through a series of ports. The larger piston assembly provides the actual control of fluid flow through selected ports, while the smaller activation piston assembly actually provides the arming and de-arming of the "SAFE LOCK ANTI-THEFT HYDRAULIC BRAKE CONTROL SYSTEM." The small activation piston assembly, in effect, allows for the necessary mechanical advantage effect to take place to automatically drive the larger piston assembly into the actual lock-up mode for the overall system. The control member, when inserted into the brake control of the vehicle, does not affect the normal front and rear brake functions.

Interconnected with the control member on the brake cylinder outlet sides of the control member is a small accumulator system. This accumulator system is designed such that it is only activated when the lock-up feature of the control member is activated. The accumulator system perfectly compensates for the effects of environmental temperature changes on the small braking system hydraulic fluid volume changes by either absorbing positive volume change or by feeding out fluid to accommodate negative volume change.

Connected to the small activation piston assembly of the control member is an arming system. This arming system further comprises an electrically isolated cable connected to an arming switch driven by a key, an electrically insulated metallic sheath electrically connected to other alarm systems on the vehicle. The key, driven manually through the cable connection, positions the small piston assembly in the control member for arming and de-arming the entire system.

Connected to the control member and activated by motion of the large piston assembly is an interlock switch. When the lock-up function is activated, this switch provides a means to prevent ignition from occurring. When the overall system is de-armed, the normal ignition function can occur.

To anyone familiar with the art, it can be seen that the invention disclosed herein eliminates the deficiencies of the above designs and offers a rugged, flexible and practical solution to the use of hydraulic lock-up means to minimize vehicle theft.

BRIEF DESCRIPTION OF THE DRAWINGS

The advantage and features of novelty of the "SAFE LOCK ANTI-THEFT HYDRAULIC BRAKE CONTROL SYSTEM" will become more apparent as the description proceeds, in conjunction with the accompanying drawings, in which.

DESCRIPTION OF THE PREFERRED EMBODIMENT

Figure 1:
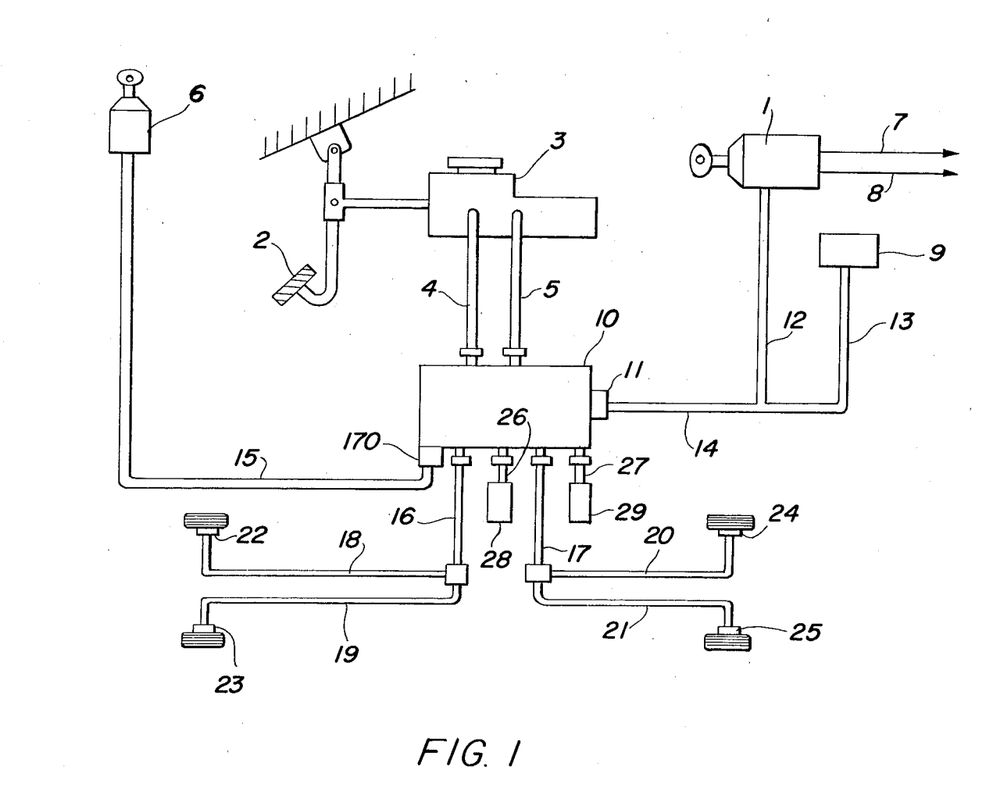
FIG. 1 is a schematic of the "SAFE LOCK ANTI-THEFT HYDRAULIC BRAKE CONTROL SYSTEM," showing the master body of the control member as it is placed in the braking system, the sensing switch and ignition interlock network system, the arming mechanism together with its anti-tampering circuit system installed in the vehicle, and the thermal expansion and contraction fluid accumulation system.
Figure 6:
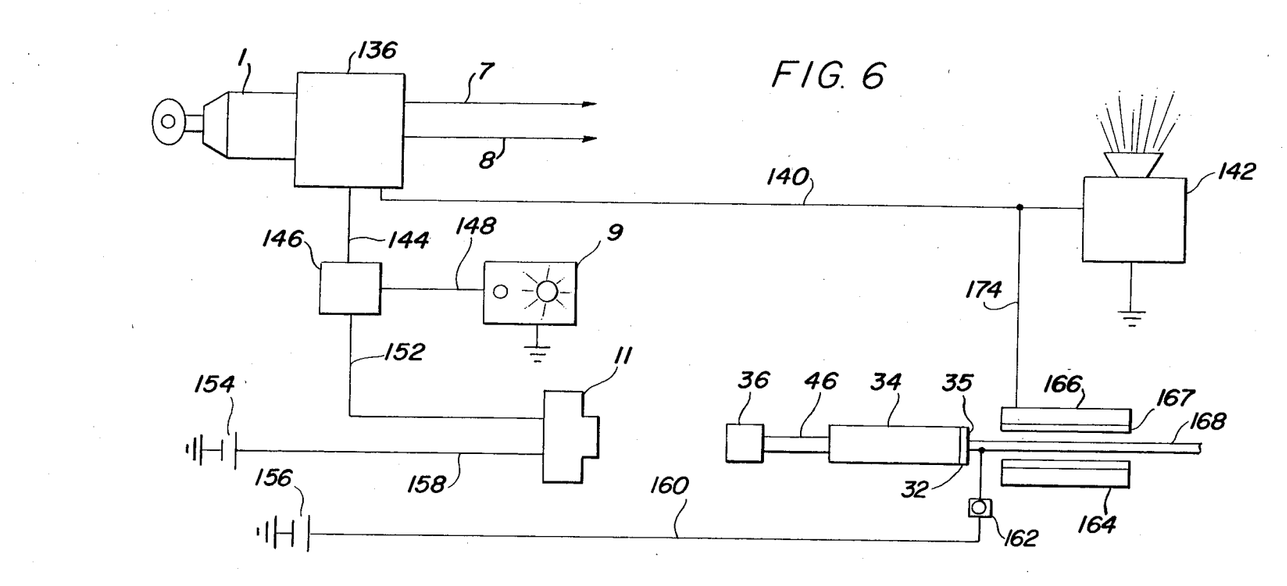
FIG. 6 shows schematically the interlock switch system for vehicle ignition control and tie-in to a vehicle alarm system in the event of attempted theft.

The "SAFE LOCK ANTI-THEFT HYDRAULIC BRAKE CONTROL SYSTEM" is generally shown in one embodiment in FIG. 1, in which the master body 10 of the control member is placed in the braking system which includes the foot brake 2, the master cylinder 3, feed lines 4 and 5, wheel cylinder feed lines 16 and 17, distribution lines 18, 19, 20 and 21, wheel cylinders 22, 23, 24 and 25. The master body 10 also serves as the mount for a sensing switch 11 which is electrically interlocked by cable No. 14 and cable No. 12 with the ignition switch 1 and the starter system leads 7 and 8. In addition, the sensory switch 11 is also electrically tied by the cable 168 to any available alarm system 142, as shown in FIG. 6, and to a display monitor 9 through cable 13 tied into cable 14.

A manual arming and de-arming lock 6 and cable 15 system attach to the master body 10 through a terminating attachment 170.

An accumulator system is also provided by two accumulators, 28 and 29, which receive and discharge brake fluid from the master body 10 by hydraulic lines 26 and 27, respectively.

Figure 2:
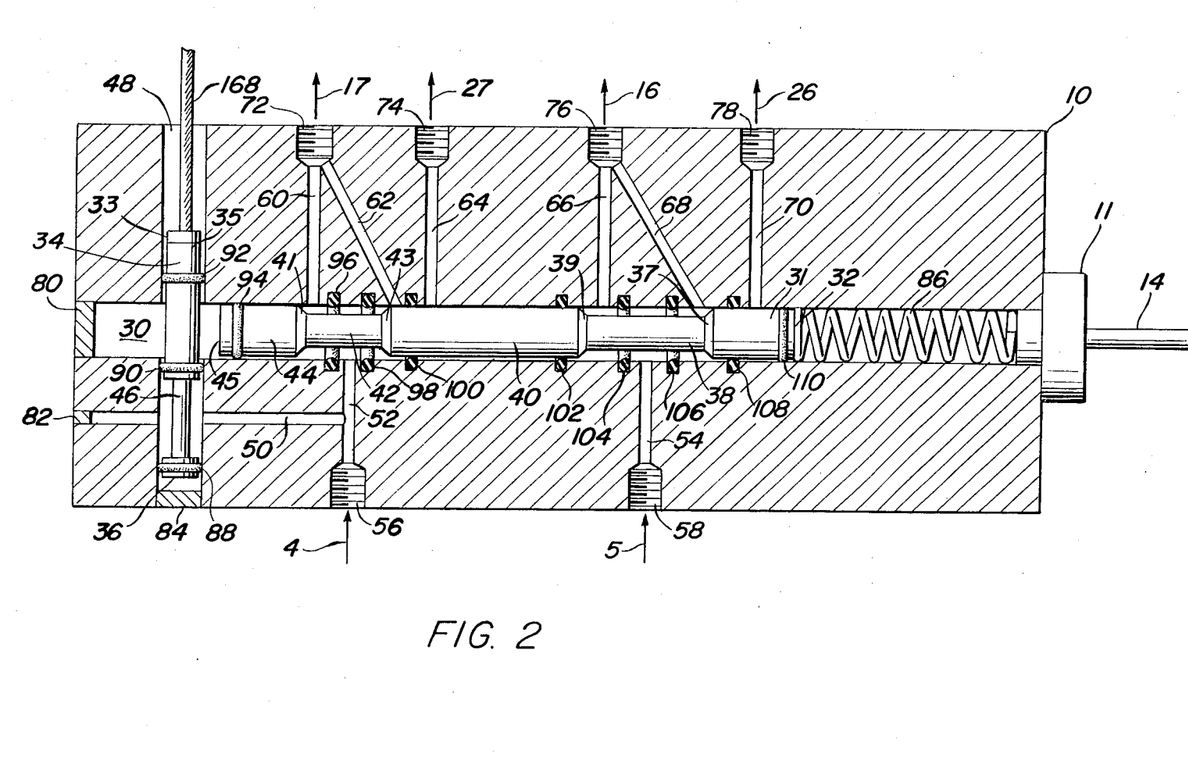
FIG. 2 is a cross-section through the master body of the control member, showing the flow ports from the vehicle master cylinder and the feeder ports to the wheel cylinders and accumulators. The lock-up valving function piston assembly is shown in the normal operating mode, allowing hydraulic fluid to pass freely between the master cylinder and the wheel cylinders. The lock-up valving function piston assembly in this position allows connection of an interlock switch system with a contact allows connection of an interlock switch system with a contact switch wich emables the normal ignition of the vehicle to take place.

In normal operation of the vehicle, the arming lock 6 is not activated, and the braking function of the brake 2 is carried out without interference by braking action through the master body 10, as shown in FIG. 2. In the anti-theft mode with the vehicle stopped, the brake 2 is depressed, driving hydraulic brake fluid from the master cylinder 3 to the wheel cylinders 22, 23, 24 and 25. While the brake 2 is depressed, the manual arming lock 6 is activated by means of a key. The mechanical cable 15 assembly through connection 170 activates an activation piston assembly member 35 in the master body 10. (See FIG. 2 and FIG. 3.)

Figure 3:
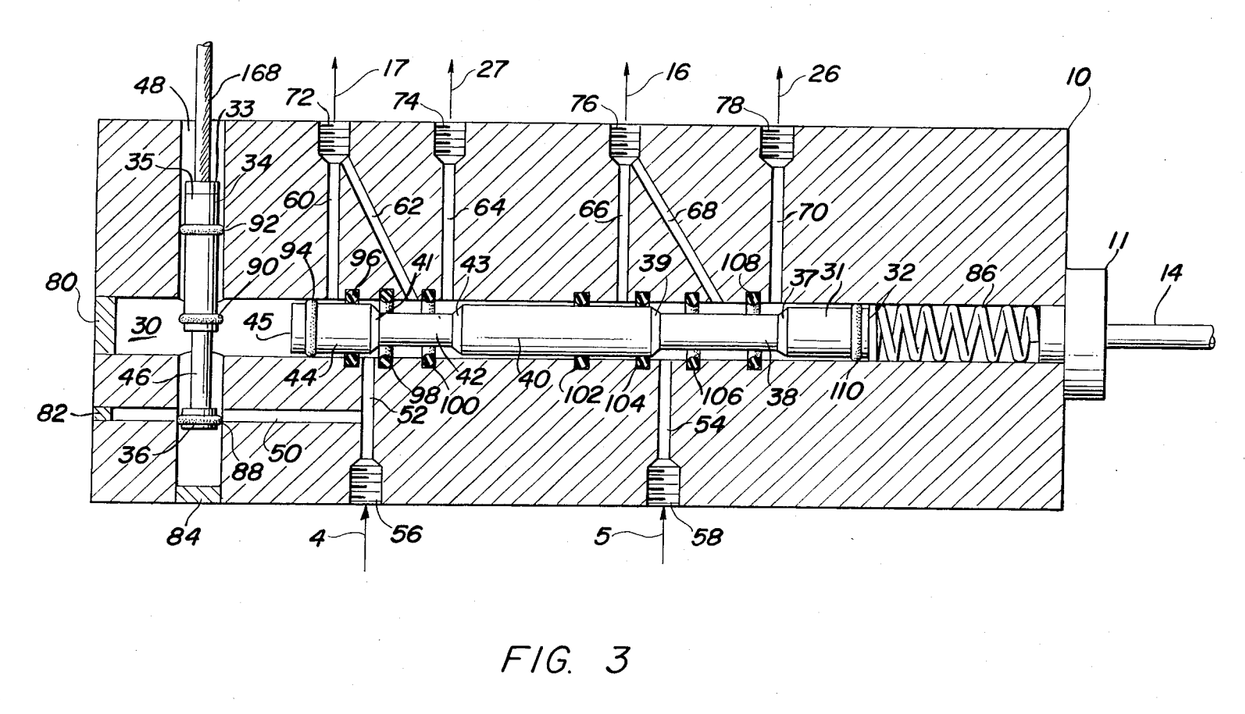
FIG. 3 is a cross-section of the master body of the control member as in FIG. 2 but with the lock-up valving function piston assembly in the transition to activated position, allowing hydraulic fluid to flow into or out of the wheel cylinders and also into the thermal expansion and contraction accumulators.

In arming the system (FIG. 3 shows the transition from normal to lock-up position) into the anti-theft mode, the arming lock 6 through cable 168 moves the activation piston assembly 35 inside the master body 10 to a position which allows hydraulic fluid to flow from line 4 and adapter cavity 56 to port 52 and also pass through the port 50 into the bore 48 and into the bore 30 and to act against the end area 45 of piston 44 of the master body 10 lock-up valving function piston assembly 32. Lock-up valving function piston assembly 32 consists of piston 44, piston 40, piston 31 with pistons 44 and 40 connected by a reduced diameter shaft 38 and pistons 40 and 31 connected by reduced diameter shaft 38. The end area 45 of piston 44 has an area such that the hydraulic pressure increase due to movement of brake 2 causes a force sufficient to push the lock-up valving function assembly 32 to a position that allows fluid to also begin to enter the accumulators 28 and 29 through cavity adapters 72, 76 and lines 27 and 26 via ports 64 and 70. The lock-up valving function piston assembly 32 is opposed in motion by spring 86 which presses against the large diameter end of piston 31. Interior to the bore 30, the shafts 42 and 38 connect to end surfaces 41, 43 and 39, 37 respectively, and the end surfaces 41, 43, 39, 37 have areas that are identical; as a result, there are no resultant net forces on these surfaces, leaving only force on the end area 45 and that caused by the spring 86. As the pressure builds up on end area 45, spring 86 is compressed until the spring force equals the force on the end area 45, or a mechanical stop means is reached. Bore 30 is sealed off with end plug 80. Port 50 is sealed on one end with end plug 82.

Activation piston assembly 35 consists of pistons 34 and 36, connected by reduced diameter shaft 46. An electrical insulating end cap 33 is attached to piston 34. Activating cable 168 is attached to end cap 32. This activation piston assembly 35 fits in bore 48. Bore 48 is sealed on one end with plug 84.

Figure 4:
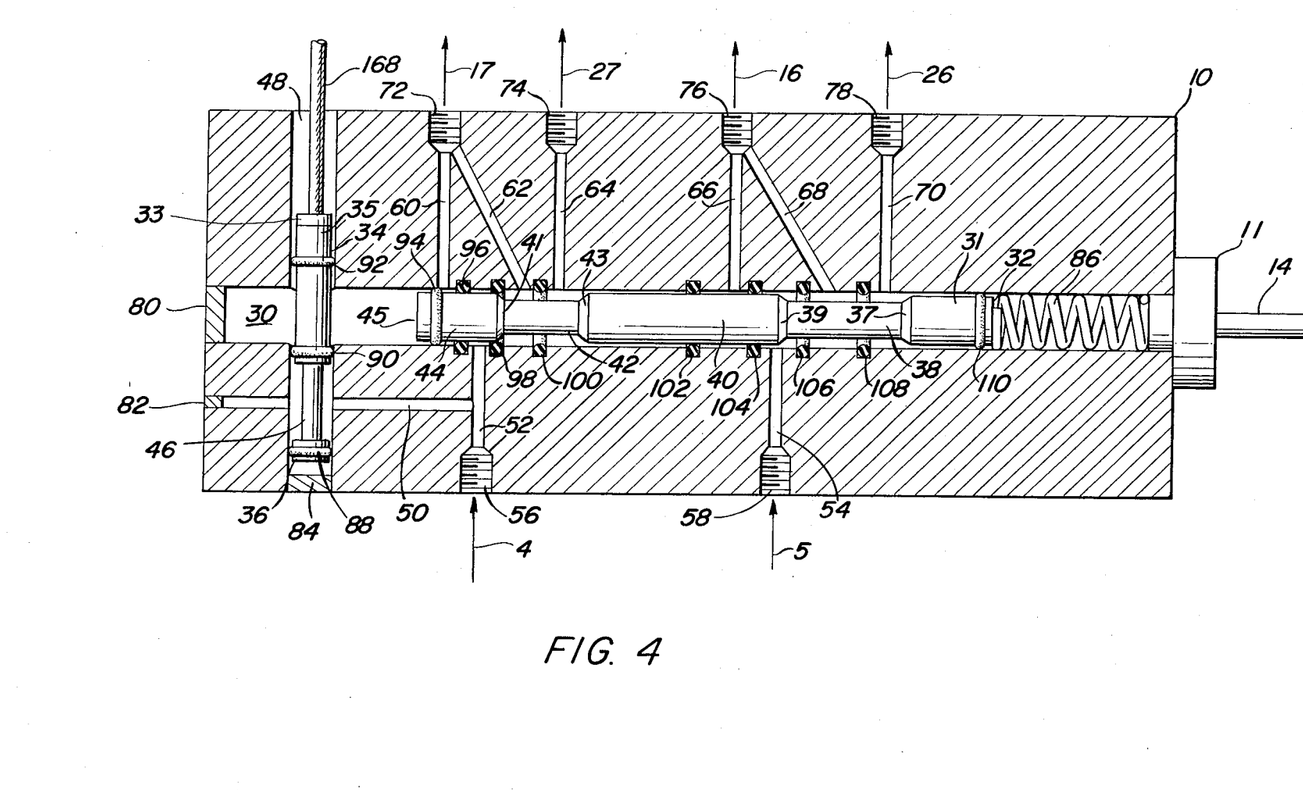
FIG. 4 is a cross-section of the master body with the hydraulic system of the brakes in the locked position.

With the brake hydraulic system energized, the arming lock 6 is activated to its normal position again to restore activation piston assembly 35 to its normal position, as shown in FIG. 4, leaving the accumulators 28 and 29 in the charged mode and the front and rear brakes of the vehicle activated.

The system is deactivated by the use of the arming switch 6 to move activation piston assembly 35 into the intermediate position which allows the hydraulic fluid stored at high pressure to return to the master cylinder via ports 50, 52, 54, 62, 64, 68 and 70.

The master body 10 is introduced into the regular braking system of the vehicle by being placed into the line system of outlets 4, 5 of the master cylinder 3 which would normally connect to lines 16 and 17. The accumulators 28, 29 are attached at a convenient location to the master body 10.

When the arming system is activated, the ignition of the vehicle by ignition lock 1 cannot be accomplished until the locked up high-pressure fluid is released back to the master cylinder 3, which allows the lock-up valving function piston assembly 32 to return to its normal position and deactivates switch 11. The internal operation of the lock-up means for the hydraulic fluid will become more apparent when the various views of the master body 10 are reviewed further, below.

In FIG. 2, the normal brake action operation is indicated. Fluid from the master cylinder 3 is activated to flow to the brake cylinders when brake 2 is depressed, said fluid flowing from lines 4, 5 into cavity adapter inlets 56, 58 of the master body 10. This fluid further passes by means of ports 52, 54 into a central bore 30. The diameter of the lock-up valving function piston assembly 32 is reduced in two locations to shafts 42, 38 with reduced diameters to allow the hydraulic fluid to flow freely into the front and rear brake cylinders 22, 23, 24, 25 by means of ports 60, 62, 66, 68. For the front brake cylinders 24, 25, the fluid flows further through cavity port connection 72 into line 17. For the rear brake cylinders 22, 23, the fluid flows through cavity port connection 76 into line 16. In the normal mode, lock-up valving function piston assembly 32 is held in the position of FIG. 2 by means of a spring 86. Activation piston assembly 35 is positioned such that no fluid passes by means of port 50 into the master body 10 bore 30.

As previously indicated, lock-up valving function piston assembly 32 consists of three full diameter pistons 31, 40, 44 and two smaller diameter shafts 38, 42. The diameters 38 and 42 are designed such that the diameter of piston 44 provides a means of placing an unbalanced force on lock-up valve function piston assembly 32 when the system is activated. This unbalanced force occurs when the pressure on the end area 45 of piston 44 is raised. The pressure on the smaller shafts 38, 42 always results in a balanced force on the remaining part of the lock-up valving function piston assembly 32. The overall unbalanced force caused by pressure on the end area 45 of piston 44 is resisted by the depression of the spring 86. The spring 86 is a linear spring with a force given by $F_s = KK$ where $F_s$ is the spring force, X is the displacement, and K is the spring constant. The force on the end of the piston is $F_p = PA$ where $F_p$ is the force, P is the hydraulic pressure, and A is the area of the end 45 of the piston 44.

In the activation of the anti-theft system, the activation piston assembly 35 is retracted by means of cable 168 to a position where fluid can flow through port 50 into bore 48. The reduced diameter of shaft 46 of piston assembly 35 further allows the fluid to flow into bore 30 and operate against the end area 45 of piston 44. As brake 2 is further depressed, the pressure against the end area 45 of piston 44 builds up and drives the lock-up valving function piston assembly 32 to a further position, such that the spring 86 is depressed until the pressure forces and the spring forces are balanced, or a mechanical stop means is used. The ports 64, 70, which allow fluid to flow to the accumulators 28, 29 through cavity ports 74 and 78, are uncovered, and the accumulators also become charged with pressurized fluid. Further depression of the brake 2 causes the lock-up valving function piston assembly 32 to move to a position such that the ports 52, 54 are locked off and no further fluid can flow into the braking system.

To maintain the locked position, activation piston assembly 35 is returned to its normal position by use of cable 168. In this position, fluid cannot flow through port 50 into bore 48 and further into bore 30. As stated before, activation piston assembly 35 consists of two larger diameter pistons 34, 36 and a small shaft 46, and an insulated end cap 33 to which cable 168 is attached. The pressure forces on piston assembly 35 are always balanced. The diameter of bore 48 is made as small as possible to minimize the activation loads on cable 168.

Necessary sealing function is provided by conventional O-rings. Activation piston assembly 35 utilizes three O-rings 88, 90, 92. Lock-up valving function piston assembly 32 utilizes two O-rings 94, 110 to prevent end flow of hydraulic fluid. The other necessary sealing O-rings 96, 98, 100, 102, 104, 106, 108 are placed in the master body 10 in this embodiment. Of course, the sealing O-rings may be replaced by other types of seals and may be in the body or on the piston assemblies as a matter of choice by the designer.

Figure 5:
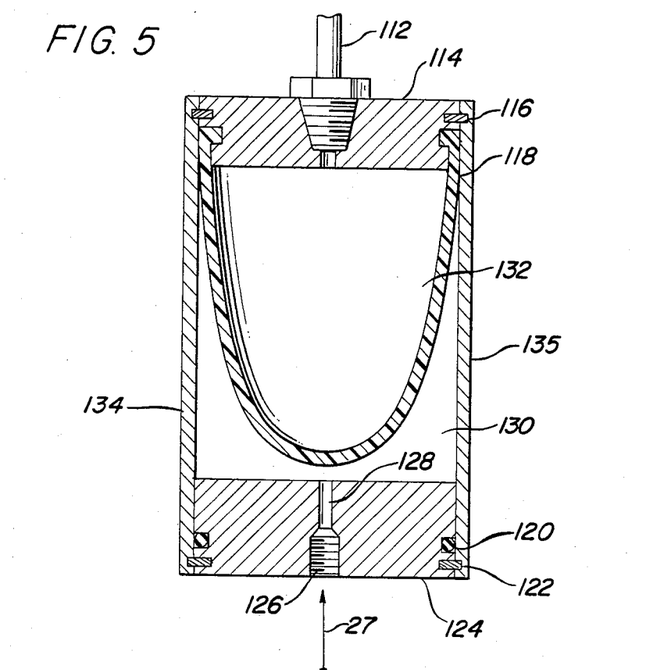
FIG. 5 is a cross-section of a gas pressurized accumulator which is a present state-of-the-art technology and which provides for the small reservoir of hydraulic fluid needed to accommodate the anticipated thermal expansion and contraction of the hydraulic fluid.

To accommodate the thermal expansion of the hydraulic fluid, accumulator systems 28 and 29 are used. These accumulator systems, 28 and 29, may be separated from the master body 10, or they may be integral with the master body 10. The amount of fluid to be accommodated is typically small, being in the order of one cubic inch for each accumulator to accommodate over 100° F. of environmental temperature change. An appropriate accumulator 134, FIG. 5, consists of a pressure shell 135, an end plug 124, an end plug 114, a flexible bladder 118, a gas pressurizing valve assembly 112 to pressure gas volume 132, a sealing O-ring 120 and an entry port 126 with a connecting port 128. Hydraulic fluid flows by means of line 27 from port 74 (or port 78) through port 128 into fluid volume 130. This fluid in fluid volume 130 is under pressure and depresses bladder 118 against the gas volume 132. When the pressure in volume 130 is equal to the pressure in volume 132, no further fluid can flow from port 128 into volume 130. The initial pressure in volume 132 is typically selected to be in the 150 to 200 psia range, but other pressures may be used. The end cap 124 is retained by snap ring 122. The end cap 114 is retained by a snap ring 116. The final pressure is then at the brake lock-up pressure. With the brakes locked up, should a temperature change occur which causes the fluid to expand or contract, the accumulator compensates for such a change by either taking up fluid on expansion and flows from line 27, for example, or discharging fluid on contraction through line 27, for example, thus keeping the braking system in the locked-up mode. The accumulator further prevents damage to the braking system that might be caused by excessive thermal expansion of the brake fluid.

The fluid trapped in the bore 30, which is acting against the end area 45 of piston 44, will also expand or contract with thermal change; however, this fluid volume change will be quite small. Such small volume changes must be accommodated; if the temperature in bore 30 goes up, the fluid expands and increases the force against the end area 45 of piston 44, causing the piston assembly 32 to move slightly against the spring 86. If the temperature in bore 30 falls, the volume of the fluid in bore 30 contracts, causing a slight reduction in the force on the end area 45 of piston 44. The lock-up valving function piston assembly 32 then is displaced slightly by the spring 86 until the spring and pressure forces are again balanced. In effect, lock-up valving function piston assembly 32 and spring 86 act as a regulator to control the effects of temperature change.

FIG. 6 further shows schematically the additional features of this invention as they pertain to the safety of operation and additional auto-theft destructive tampering alarm warning. Switch 11 provides an electrical contact closure circuit when lock-up valving function piston assembly 32 depresses the spring 86 sufficiently to activate switch 11. Switch 11 could also be any type of sensing switch which detects position of the lock-up valving function piston assembly 32. Power from battery 154 is supplied to switch 11 by circuit leg 158. When switch 11 is deactivated, it does not allow power to flow by conductor 158 through switch 11 and by conductor 152 to trickle flow switch 146 and into the ignition switch electrical system 136 by conductor 144 which is activated by key switch 1. Further, the normal indicator and buzzer 9 is not capable of being activated via conductor leg 148 in cable 13 in this mode when the key switch 1 is energized. When switch 11 is activated, should the key switch 1 be attempted to be energized, a conductor leg 140 carries electrical power to a conventional alarm 142, if alarm 142 is included in the circuit. The battery power source 156, which is the same source as 154, is connected by conductor leg 160 to the control activating cable 168 by connect point 162. This cable 168 is electrically isolated at the arming switch 6 and at the activation piston 35 by insulating end cap 33. Cable 168 is insulated from a metal sheath 166 by a standard abrasion-free insulator covering 167. The metal sheath 166 and its internal insulator 167 and external insulator 164 surround the activation cable 168. This metal sheath 166 is connected to conductor leg 174 which, in turn, goes to the alarm circuit conduction leg 140. If one attempts to cut cable 15 and the arming cable 168, the metal sheath 166 short circuits to the arming cable 168 and activates the alarm 142.

An added feature of the "SAFE LOCK ANTI-THEFT HYDRAULIC CONTROL SYSTEM" is that if cable 168 is cut, activation piston assembly 35 will not move to deactivate the lock-up mode. Only active de-arming by switch 6 will deactivate the system.

Figure 7:
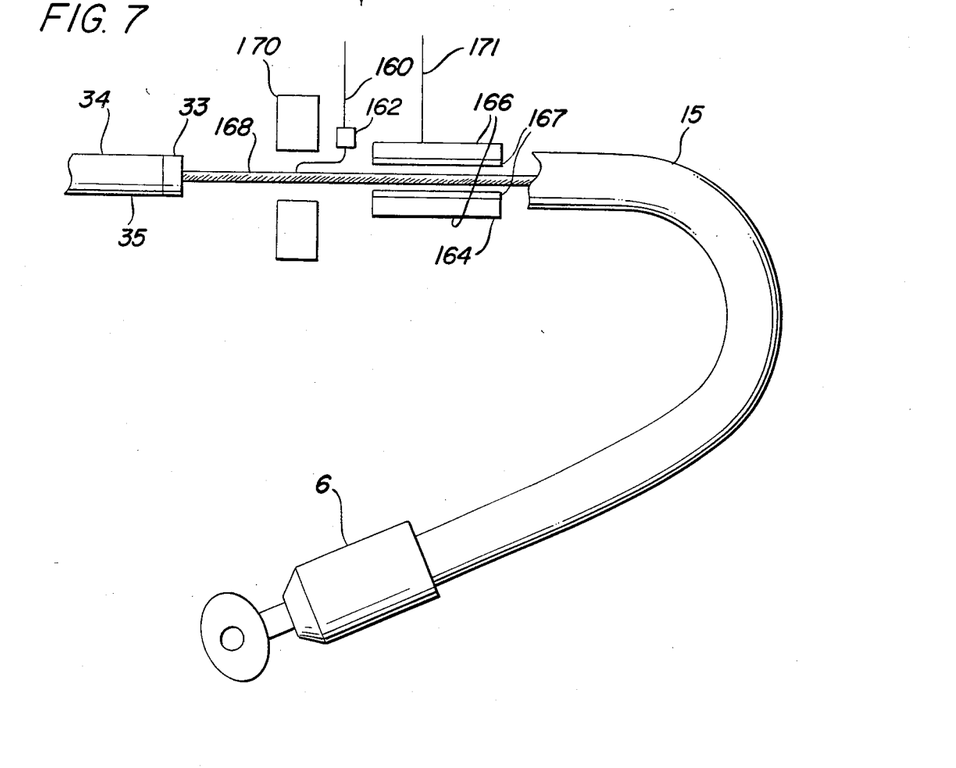
FIG. 7 shows the arming system mechanism together with its anti-tampering isolation and partial circuit for the case of attempted destructive tampering.

FIG. 7 shows the arming mechanism system down to its attachment to insulator pad 32 on the activation piston system. A conventional key-driven switch 6 is used to drive and pull cable 168 inside cable assembly 15, as it is attached to pad 32, which, in turn, activates the activation piston assembly 35. Electrical lead 162 is the power lead from a battery supply conductor 160, and it is connected to the electrically isolated cable 168. Electrical conductor 171 is connected to the insulated 167, 164 metal sheath 166 and goes to the alarm circuit. The arming cable 168 assembly terminates in the end connection 170 which anchors the arming cable assembly to the master body 10.

The arming switch 6 manual energy requirements are determined mostly by the sizing of the constant diameter pistons 34, 36 and the O-rings 88, 90 and 92. Lock-up pressures on the order of 500 psia are not unusual in a brake system. Even though the pistons 34, 36 are of constant diameter and pressure balanced, the O-rings exert friction force on the pistons, and this friction force resists motion of activation piston assembly 35 and ultimately of the switch 6. As an example, if the bore 48 diameter is on the order of 0.30 inch, the expected friction force would be approximately 5 pounds. This force can be manually exerted by a normal key operation.

As is evident from the discussion, the master body 10 can be placed anywhere in the vehicle which is convenient. The accumulators 28 and 29 can also be similarly placed. The arming mechanism switch 6 can be placed on the dashboard or elsewhere if desired.

It is apparent that the preferred embodiments described herein are only exemplary and that various modifications can be effected in construction and arrangement within the scope of my claims of invention. The switch 11 may be replaced by magnetically activated reed switches, for example, which are activated as lockup valving function piston assembly 32 is moved past the reed switches. It is noted that piston assembly 32 can be permanently magnetized or a magnet can be inserted in the end of piston 31 to serve a signaling function, if desired, so long as piston 31 is nonmagnetic.

AN ALTERNATIVE EMBODIMENT

While the O-ring seals in the cylindrical bores will provide excellent sealing, the sealing will not be absolutely perfect, and a small longtime leakage of hydraulic fluid through the master body 10 and its internal piston assemblies 35 and 32 can be expected to occur. Over a long period of time, this leakage will reduce the brake pressure in the brake cylinders 22, 23, 24, 25 to a point where the vehicle is not immobilized. When this occurs, lock-up valving function piston assembly 32 will move to a point where the regular braking function will occur and allow the vehicle to be moved. To prevent such a problem from occurring, in an alternative embodiment the activation piston assembly 35 is modified as in FIG. 8 to incorporate a small one-way valve.

Figure 8:
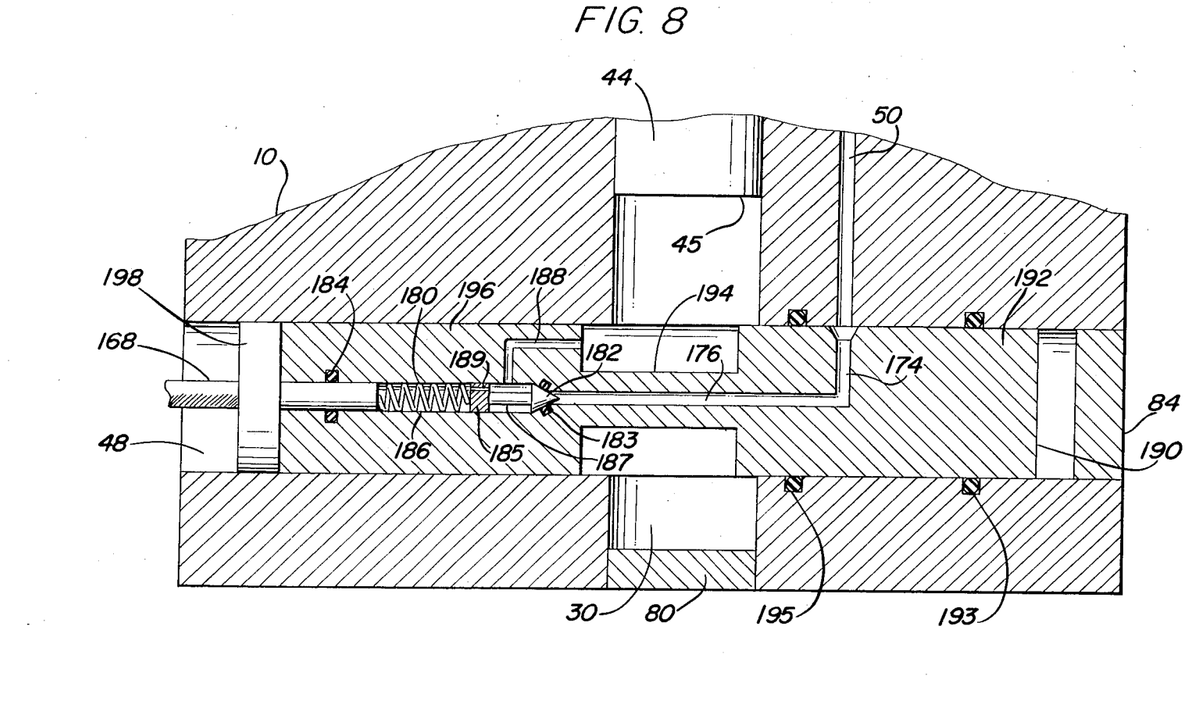
FIG. 8 is a cross-section of the master body of the control member with an alternative flow control valve assembly integrated into the small activation piston assembly.

FIG. 8 shows an alternative embodiment of the activation piston assembly placed in the master body 10 (cutaway section), wherein activation piston assembly 35 of FIG. 2 is replaced by activation piston assembly 190. Activation piston assembly 190 has a piston 192 connected by a shaft 194 to piston 196. Cable drive 168 is connected to an insulated end cap 198 suitably electrically insulated, and end cap 198 also provides the means to compress spring 180 against valve piston 185. Piston 185 is ported by port 189 to allow fluid to freely communicate into bore 186. Valve piston 185 is connected by shaft 187 to valve pintle 182. Valve pintle 182 in the closed position seats on seal 183. The valve piston 185 along with its connecting shaft 187 and valve pintle 182, the spring 180, rest inside bore 48 in the master body 10. The insulated end cap 198 has a cylindrical shaft which interfaces with seal 184 in bore 48 to prevent leakage. When valve pintle 182 is open off the seat 183, bore 48 communicates with port 176, which in turn communicates with port 174. With the valve pintle 183 unseated, brake fluid can communicate with ports 174, 176, bore 48, port 188, and bore 30, if brake fluid can pass from port 50 in the master body 10. In the normal lock-up activation mode, activation piston assembly 190 is positioned by means of cable 168 to a position similar to that in FIG. 3, allowing direct communication of brake fluid between port 50 and bore 30. In the lock-up mode, activation piston assembly 190 is further drawn by cable 168 to the position shown in FIG. 8 to allow communication between port 174 and port 50. So long as the lock-up pressure in bore 30 is at or above a preselected pressure in the nominal 200 to 500 psi range, brake pedal 2 action will not cause valve pintle 182 to lift off seat 183. When the pressure in bore 30 falls below the preselected value, any pressure on brake pedal 2 will cause bore 30 to be recharged to the lock-up range. Spring 180 and valve pintle 182 fluid exposure areas are selected to optimize the lift-off pressure. This alternative embodiment of the activation piston assembly offsets the effects of any deleterious leakage on the lock-up valving function piston assembly 32 of FIG. 2, should any of the critical seals on lock-up valving function piston assembly 32 develop adverse leakage rates. O-ring seals 193, 195 provide the necessary sealing on piston 192. All other functions of the "SAFE LOCK ANTI-THEFT HYDRAULIC BRAKE CONTROL SYSTEM" remain the same as described in the preferred embodiment discussion. The one-way valve pintle 182, valve piston 195, and connecting shaft 187 are shown for illustration purposes only. Any suitable small check valve could be used.

Figure 9:
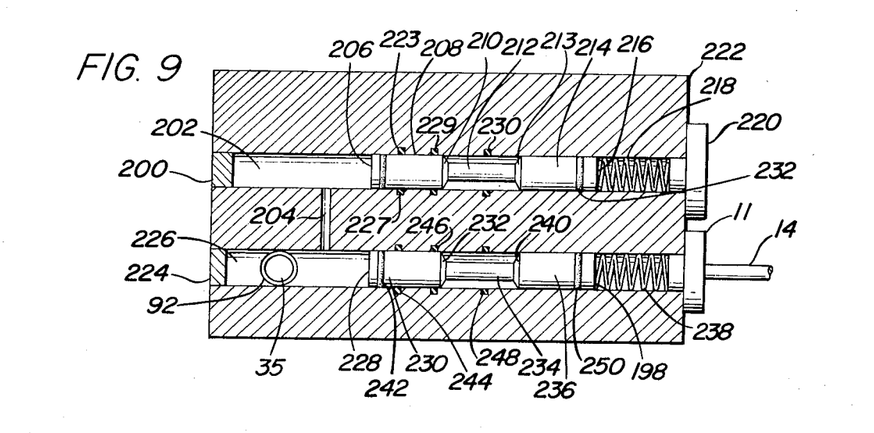
FIG. 9 is a cross-section of the master body of the control member with an alternative embodiment of the lock-up valving function piston assembly.

FIG. 9 shows a further alternative embodiment of the invention, wherein the single lock-up valving function piston assembly 32 of FIG. 2 has been divided into two lock-up valving function piston assemblies, 198 and 216. Lock-up valving function piston assembly 198 could provide the lock-up function for the front wheels, and lock-up valving function piston assembly 216 could provide the lock-up function for the rear wheels, for example. The activating piston assembly 35 of FIG. 2 remains the same and provides the means for causing motion of lock-up valving function piston assemblies 198 and 216 to occur. In this alternative embodiment, the master body 10 of FIG. 2 is replaced by the alternative master body 222, which contains two bores, 202 and 226, for containing the lock-up valving function piston assemblies 198 and 216. The lock-up valving function piston assemblies 198 and 216 are identical. Lock-up valving function piston assembly 198 is made up of two pistons, 230 and 236, of identical diameters connected by a reduced diameter shaft 234 which allows for brake fluid to flow in and out of bore 226 to the actual brakes. Similarly, lock-up valving function piston assembly 216 consists of two pistons, 208 and 214, connected by a reduced diameter shaft 212 which allows for brake fluid to flow in and out of bore 202 to the actual brakes controlled by lock-up valving function piston assembly 216. The end areas, 206 and 228, are greater than the areas 210 and 232. As a result, the same pressure on end areas 206 and 288, as on the surfaces 210 and 232, will cause the lock-up valving function piston assemblies 198 and 216 to compress the springs, 238 and 218, until equilibrium is achieved with the brake systems locked up. The areas 232, 240, 210, 213 are equal and pressure forces on their surfaces exactly balance out to a net force of zero. Lock-up valving function piston assembly 216 is sealed with O-ring seals 223, 227, 229, 230 and 232, while lock-up valving function piston assembly 198 is sealed with O-ring seals 242, 244, 246, 248 and 250. The sensory switch 11 need only be placed in the end of bore 226 and is activated by the compression of spring 238. Activation piston 35 is shown in the end view in FIG. 9 with sealing O-ring 92. Bore 226 is closed out on one end with end cap 224, while bore 202 is closed out on one end with end cap 200. To close out the other end of bore 202, a dummy sensory switch plug 220 is used, although an actual sensory switch, similar to sensory switch 11, could be used. To make possible the operation of lock-up valving function piston assembly 216, bores 202 and 226 are interconnected with port 204 which allows brake fluid to communicate between bores 202 and 226 when activation piston assembly 35 is activated as previously discussed. End cap 200 is adjusted in length to make the volume of fluid acting on area 206 identical to that volume of fluid acting on end area 228. The inlet and outlet ports for allowing brake fluid in and out of the master body 222 are still required, as previously discussed in the preferred embodiment discussion.

To those skilled in the art, it will be apparent that a number of modifications and substitutions are possible in the concepts presented herein. The fluid control for lock-up paths to wheel cylinders can obviously be expanded to more than two, or contracted down to one. The implementation could employ the control member, accumulation system, and arming system only. The geometry could result in the control member and accumulation system being integrated into the same unit or even with full integration into a master brake cylinder housing assembly. Because of the myriad of possibilities, it is appropriate that the appended claims be construed broadly, while being in a manner totally consistent with the scope of the herein described invention. It is apparent that the preferred embodiments described herein are only exemplary and that various modifications can be effected in construction and arrangement within the scope of my claims of invention.

What I claim is:

1. A safe lock anti-theft hydraulic brake control system which comprises:
 (a) A brake hydraulic fluid control member, which is installed functionally in a vehicle brake hydraulic system between a vehicle brake master cylinder and one or more vehicle wheel brake cylinders;
 (b) A brake hydraulic fluid thermal expansion and contraction accumulation system, which is placed in the brake hydraulic system between said fluid control member and said wheel brake cylinders;
 (c) A sensing switch, which is activated by said control member to prevent vehicle ignition;

(d) A manually operated arming and de-arming system, which activates and deactivates said control member;

(e) A means in said control member which provides activation of said ignition interlock switch;

(f) An electrical connector means in said arming and de-arming system, which provides for appropriate alarm signal if said arming and de-arming system is destructively tampered with.

2. A safe lock anti-theft hydraulic brake control system, as recited in claim No. 1, in which said manually operated arming and de-arming system further comprises:

(a) A manually driven key switch;

(b) An electrically isolated cable connected on one end to said key switch mechanism and on the other end to an electrical isolation end cap of an activation piston assembly in said brake hydraulic fluid control member;

(c) An electrically interior and external insulated metal sheath cable assembly in which is housed said electrically isolated cable;

(d) An insulated electrical power supply lead connected to said insulated metal sheath of said cable assembly;

(e) An insulated electrical lead connected to said electrically isolated cable, the function of such electrical lead being to provide closure of an external alarm circuit if said metal sheath cable assembly is destructively tampered with;

(f) A means suitable for attaching said electrically isolated cable to said key switch;

(g) A means suitable for attaching said electrically isolated cable to said electrical isolation end cap;

(h) A means suitable for attaching said electrical power supply lead to said metal sheath;

(i) A means suitable for attaching electrically insulated lead to said electrically isolated cable.

3. A brake hydraulic fluid control member which comprises:

(a) A body containing two primary cylindrical bores whose centerlines are perpendicular, and which bores communicate with each other;

(b) An activation piston assembly separately located in one of said two bores;

(c) A brake hydraulic fluid control lock-up valving function piston assembly located in said bore not containing said activation piston assembly;

(d) A plurality of brake hydraulic fluid inlet flow ports connected to said bore in which said brake hydraulic fluid control lock-up valving function piston assembly is located;

(e) A plurality of brake hydraulic fluid exit flow ports connected to said bore where said brake hydraulic fluid control lock-up valving function piston assembly is located, and said exit flow ports communicate in such manner as to allow flow of brake hydraulic fluid into and from said inlet flow ports to said exit flow bores when said brake hydraulic fluid control lock-up valving function piston assembly is not activated;

(f) A plurality of additional brake hydraulic fluid exit flow ports connected to said bore where said brake hydraulic fluid control lock-up valving function piston assembly is located and said additional brake hydraulic fluid exit flow ports allow brake hydraulic fluid flow into and from said brake wheel cylinders as said brake hydraulic fluid control lock-up valving function piston assembly is caused to move to a position of activation;

(g) A plurality of brake hydraulic fluid exit ports connected to said bore where said brake hydraulic fluid control lock-up valving function piston assembly is located, and said brake hydraulic fluid exit bores allow brake hydraulic fluid to flow into and out of an accumulator system when said brake hydraulic fluid control lock-up valving function piston assembly is caused to move to a position of activation;

(h) A plurality of brake hydraulic fluid seals which control said brake hydraulic fluid flow when said brake hydraulic fluid control lock-up valving function piston assembly is located in any position from normal braking function to locked-up braking function;

(i) A plurality of brake hydraulic fluid seals which control brake hydraulic fluid flow in conjunction with movement of said activation piston assembly;

(j) A spring mechanically at one end attached by suitable means to one end of said brake hydraulic fluid control lock-up valving function piston assembly, said spring serving to position said hydraulic fluid control lock-up valving function piston assembly in normal braking function position when said control lock-up valving function piston assembly is not activated, and said spring attached at its other end by suitable means to an ignition interlock sensing switch which activates when said brake hydraulic fluid control lock-up valving function piston assembly is driven so as to result in a compressive load on said spring which in turn reacts on said ignition interlock sensing switch;

(k) A hydraulic brake fluid flow port which is arranged to communicate with said bore containing said activation piston assembly and one of said plurality of brake hydraulic fluid inlet flow bores, and wherein said port allows hydraulic brake fluid to flow to and from said inlet flow port, into and out of said bore containing said activation piston assembly when said activation piston assembly is manually activated and caused to move to a position allowing such flow;

(l) Means suitable for closing a nonactive end of said bore containing said brake hydraulic fluid control lock-up valving function piston assembly;

(m) Means suitable for closing a nonactive end of said bore containing said activation piston assembly;

(n) Means for closing a nonactive end of said port communicating between said bore containing said activation piston assembly and said inlet flow port.

4. A brake hydraulic fluid control member, as recited in claim No. 2, wherein said activation piston assembly further comprises:

(a) A set of two pistons of equal diameters, chosen of suitable lengths and selected to provide suitable sealing when said activation piston assembly is placed in a bore designed to receive said activation piston assembly;

(b) A reduced diameter shaft connecting said set of pistons together;

(c) An electrical insulating cap attached to one end of one of said pistons;

(d) A means of attaching said electrical insulating cap to end of said piston;

(e) A suitable means of attaching an electrically isolated arming and de-arming cable to said electrical insulating cap.

5. A brake hydraulic fluid control member, as recited in claim No. 2, wherein said brake hydraulic fluid control lock-up valving function piston assembly further comprises:
   (a) A set of three pistons of equal diameters, chosen with lengths to provide suitable sealing in said bore where said brake hydraulic fluid control lock-up valving function piston assembly is located in combination with selected seals;
   (b) A set of two reduced diameter shafts with equal diameters, said reduced diameter shafts connecting said three pistons together in a straight line in an alternating structural manner;
   (c) Said reduced diameter shafts having lengths chosen such as to allow for said connected pistons to provide control of hydraulic fluid into and out of said bore containing said brake hydraulic fluid control lock-up valving function piston assembly as said brake hydraulic fluid control lock-up valving function piston assembly is positioned with respect to inlet and outlet flow control ports;
   (d) Said control lock-up valving function piston assembly being arranged in a bore with one end of said assembly being exposed to full hydraulic fluid pressure from a vehicle braking system;
   (e) Said control lock-up valving function piston assembly being arranged in a bore with one end of said lock-up valving function piston assembly being attached to a return spring;
   (f) A means suitable to attach said control lock-up valving function piston assembly to a return spring;
   (g) Said control lock-up valving function piston assembly having diameters such that full diameter end face of piston fully immersed in hydraulic fluid provides a surface area large enough that brake hydraulic pressure exerted against said full diameter end will cause said brake hydraulic fluid control lock-up valving function piston assembly to depress said spring and result in stoppage of brake hydraulic fluid into and out of said brake hydraulic fluid control member.

6. A brake hydraulic fluid control member, as recited in claim No. 3, wherein said bore containing the activation piston assembly, further comprises:
   (a) A diameter made as small as possible to result in reduced activation loads on the selected arming mechanism;
   (b) A seal at one end to prevent undesirable leakage of hydraulic fluid out of brake system.

7. A brake hydraulic control fluid member, as recited in claim No. 3, wherein said bore containing said brake hydraulic fluid control lock-up valving function piston assembly further comprises:
   (a) A seal at one end to prevent undesirable leakage of hydraulic fluid out of brake system;
   (b) A receptacle port at opposite end of said bore from said seal to receive said sensing switch.

8. A safe lock anti-theft hydraulic brake control system, which comprises:
   (a) A brake hydraulic fluid control member, which is installed functionally in a vehicle brake hydraulic system between a vehicle brake master cylinder and one or more vehicle wheel brake cylinders;
   (b) A brake hydraulic fluid thermal expansion and contraction accumulation system, which is placed in the brake hydraulic system between said fluid control member and said wheel brake cylinders;
   (c) A sensing switch, which is activated by said control member to prevent vehicle ignition;
   (d) A manually operated arming and de-arming system, which activates and deactivates said control member;
   (e) A means in said control member which provides activation of said ignition interlock switch.

9. A brake hydraulic fluid control system with a brake hydraulic fluid control member which comprises:
   (a) A body containing two primary cylindrical bored whose centerlines are perpendicular, and which bores communicate with each other;
   (b) An activation piston assembly separately located in one of said two bores;
   (c) A brake hydraulic fluid control lock-up valving function piston assembly located in said bore not containing said activation piston assembly;
   (d) A plurality of brake hydraulic fluid inlet flow ports connected to said bore in which said brake hydraulic fluid control lock-up valving function piston assembly is located;
   (e) A plurality of brake hydraulic fluid exit flow ports connected to said bore where said brake hydraulic fluid control lock-up valving function piston assembly is located, and said exit flow ports communicate in such manner as to allow flow of brake hydraulic fluid into and from said inlet flow ports to said exit flow bores when said brake hydraulic fluid control lock-up valving function piston assembly is not activated;
   (f) A plurality of additional brake hydraulic fluid exit flow ports connected to said bore where said brake hydraulic fluid control lock-up valving function piston assembly is located and said additional brake hydraulic fluid exit flow ports allow brake hydraulic fluid flow into and from said brake wheel cylinders as said brake hydraulic fluid control lock-up valving function piston assembly is caused to move to a position of activation;
   (g) A plurality of brake hydraulic fluid exit ports connected to said bore where said brake hydraulic fluid control lock-up valving function piston assembly is located, and said brake hydraulic fluid exit bores allow brake hydraulic fluid to flow into and out of an accumulator system when said brake hydraulic fluid control lock-up valving function piston assembly is caused to move to a position of activation;
   (h) A plurality of brake hydraulic fluid seals which control said brake hydraulic fluid flow when said brake hydraulic fluid control lock-up valving function piston assembly is located in any position from normal braking function to locked-up braking function;
   (i) A plurality of brake hydraulic fluid seals which control brake hydraulic fluid flow in conjunction with movement of said activation piston assembly;
   (j) A spring mechanically at one end attached by suitable means to one end of said brake hydraulic fluid control lock-up valving function piston assembly, said spring serving to position said hydraulic fluid control lock-up valving function piston assembly in normal braking function position when said control member is not activated, and said spring attached at its other end by suitable means to an ignition interlock sensing switch which activates when said brake hydraulic fluid control lock-up valving function piston assembly is driven so as to result in a compressive load on said spring which in turn reacts on said ignition interlock sensing switch;

(k) A hydraulic brake fluid flow port which is arranged to communicate with said bore containing said activation piston assembly and one of said plurality of brake hydraulic fluid inlet flow bores, and wherein said port allows hydraulic brake fluid to flow to and from said inlet flow port, into and out of said bore containing said activation piston assembly when said activation piston assembly is manually activated and caused to move to a position allowing such flow;

(l) A fluid accumulator system integral with body of said brake hydraulic fluid control member.

10. A brake hydraulic fluid control member, which comprises:

(a) A body containing a plurality of primary cylindrical bores whose centerlines are parallel, excepting one bore which is perpendicular to all other primary bores in said body;

(b) A port which is perpendicular to said primary bores and allows communication between said primary bores;

(c) An activation piston assembly separately located in said primary bore which is perpendicular to all other primary bores;

(d) An identical member set of brake hydraulic control lock-up valving function piston assemblies with each parallel primary bore containing one brake hydraulic control lock-up valving function piston assembly;

(e) A plurality of brake hydraulic fluid inlet flow bores connected to said primary bores in which said set of brake hydraulic fluid control lock-up valving function piston assemblies is located;

(f) A plurality of brake hydraulic fluid exit flow ports connected to said parallel primary bores in which said set of brake hydraulic fluid control lock-up valving function piston assemblies is located, and said exit flow ports communicate in such manner as to allow flow of brake hydraulic fluid into and from said inlet flow ports through said exit flow ports to vehicle brake cylinders when said brake hydraulic fluid control lock-up valving function piston assemblies are not activated;

(g) A plurality of additional brake hydraulic fluid exit flow ports connected to said parallel primary bores in which said set of brake hydraulic fluid control lock-up valving function piston assemblies is located, and said additional brake hydraulic fluid exit flow ports allow brake hydraulic fluid flow into and out of an accumulator system when said brake hydraulic fluid control lock-up valving function piston assemblies are caused to move to positions of activation;

(h) A plurality of brake hydraulic fluid seals which control said brake hydraulic fluid flow when said brake hydraulic fluid control lock-up valving function piston assemblies are located in any position from normal braking function to locked-up braking function;

(i) A plurality of brake hydraulic fluid seals which control brake hydraulic fluid flow in conjunction with movement of said activation piston assembly;

(j) A set of springs, one each mechanically attached by suitable means to one end of each of said hydraulic fluid control lock-up valving function piston assemblies, said springs serving to position said hydraulic fluid control lock-up valving function piston assemblies in normal braking function position when said control member is not activated;

(k) One of said springs in said set attached at its opposite end to an ignition interlock sensing switch by suitable means, said sensing switch being activated when said attached spring compresses against said sensing switch;

(l) A hydraulic brake fluid flow port which is arranged to communicate with said bore containing said activation piston assembly and one port of said plurality at brake hydraulic fluid inlet flow ports, and wherein said port communicating with said bore containing said activation piston assembly allows hydraulic brake fluid to flow to and from one of said inlet flow ports into and out of said bore containing said activation piston assembly when said activation piston assembly is manually activated and caused to move to a position allowing such flow;

(m) Means for closing off nonactive ends of said primary bores containing brake hydraulic control lock-up valving function piston assemblies;

(n) Means for closing off nonactive ends of ports enabling communication between primary bores.

11. An activation piston assembly, which comprises:

(a) A piston set of two pistons of constant diameter selected to provide sealing in a primary bore which receives said pistons;

(b) A reduced diameter shaft which connects one end of said shaft to one piston of said set and connects a remaining end of said shaft to a second piston of said set of two pistons;

(c) An electrically insulated end cap attached to one end of one of said set of pistons;

(d) A bore in said piston to which said electrically insulated cap is attached;

(e) A suitable poppet type check valve located in said bore of said piston;

(f) A brake hydraulic fluid flow port located in both of said pistons and central to said connecting shaft;

(g) A brake hydraulic fluid flow port located in said piston not containing said poppet type check valve and which port communicates to port central to said connecting shaft;

(h) A brake hydraulic fluid flow port located in said piston containing said poppet type check valve and which port communicates to said bore containing said poppet type check valve and communicates to a volume created by said connecting shaft;

(i) A suitable seal to prevent fluid leakage from said poppet type check valve through said electrically isolated cap;

(j) A means suitable for attaching said electrically isolated cap to said piston;

(k) A means suitable for attaching an activation arming and de-arming cable to said electrically isolated cap.

* * * * *